United States Patent [19]

Stephens et al.

[11] Patent Number: 5,046,752
[45] Date of Patent: Sep. 10, 1991

[54] AXLE SUSPENSION SYSTEM

[75] Inventors: Donald L. Stephens, LaConner; James Saunders, Burlington, both of Wash.

[73] Assignee: Paccar Inc., Bellevue, Wash.

[21] Appl. No.: 562,835

[22] Filed: Aug. 6, 1990

Related U.S. Application Data

[63] Continuation-in-part of Ser. No. 394,099, Aug. 15, 1989, which is a continuation-in-part of Ser. No. 175,745, Mar. 31, 1988, Pat. No. 4,856,812.

[51] Int. Cl.[5] ............................................... B60G 5/00
[52] U.S. Cl. .................................... 280/678; 280/711; 280/713
[58] Field of Search ............... 280/678, 711, 713, 680, 280/679, 681, 677, 683

[56] References Cited

U.S. PATENT DOCUMENTS

| | | | |
|---|---|---|---|
| 1,448,224 | 3/1923 | Luce | 267/234 |
| 2,998,261 | 8/1961 | Bartlett | 280/711 |
| 3,231,258 | 1/1966 | Brownyer et al. | 267/31 |
| 3,730,550 | 5/1973 | Thaxton | 280/712 |
| 4,003,562 | 1/1977 | Kaiser et al. | 267/268 |
| 4,099,741 | 7/1978 | Sweet et al. | 280/712 |
| 4,310,171 | 1/1982 | Merkle | 280/688 |
| 4,397,478 | 8/1983 | Jensen et al. | 280/711 |
| 4,541,653 | 9/1985 | Raidel | 280/711 |

FOREIGN PATENT DOCUMENTS 2529838 2/1987 France .

Primary Examiner—Kenneth R. Rice
Attorney, Agent, or Firm—Seed and Berry

[57] ABSTRACT

A front axle suspension for a vehicle that is soft in ride and stiff in roll is provided. The front axle is coupled to a solid beam. The beam is a relatively nonflexible member. The beam is pivotally coupled at one end thereof to the frame and is freely movable at the other end thereof, being coupled to said frame through a two-shackle coupling that permits vertical displacement and prevents horizontal displacement. Two air bag springs are coupled between said beam and said frame. In a second embodiment, the spring is J-shaped, having a thick uniform thickness bend short transition sections, a uniformly tapering section, joined to a thinner end of uniform thickness. The bend is closer to the end of the spring secured to the axle than to a second end of the spring coupled to the frame. In a third embodiment, an elongated spring is connected to the pivoted end of the beam and at its opposite end to the frame. A lever surface or beam seat on the beam presses against the undersurface of the spring. The spring is of uniform thickness at the beam seat, tapering uniformly to a constant thickness section at the remote end of the spring.

21 Claims, 3 Drawing Sheets

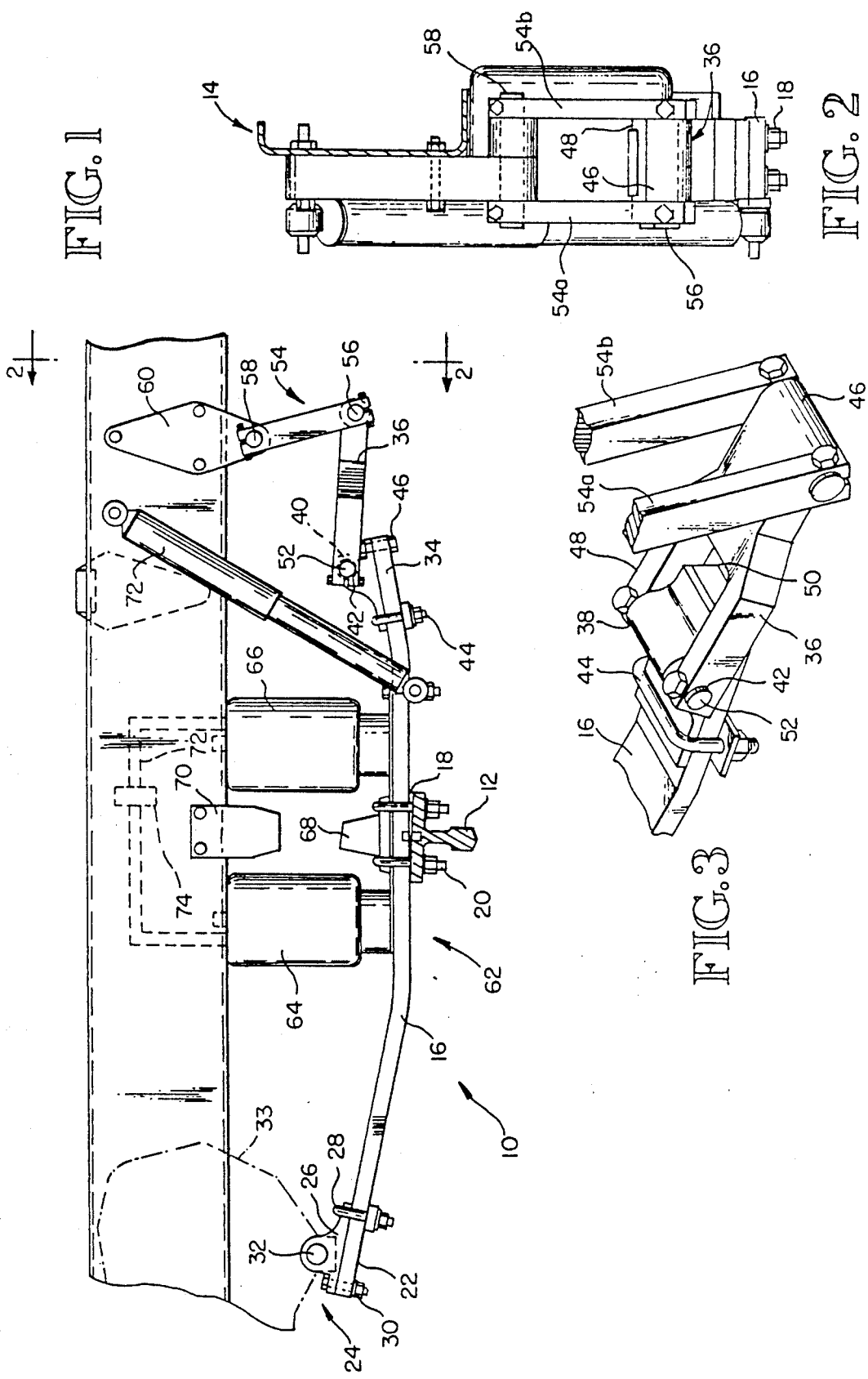

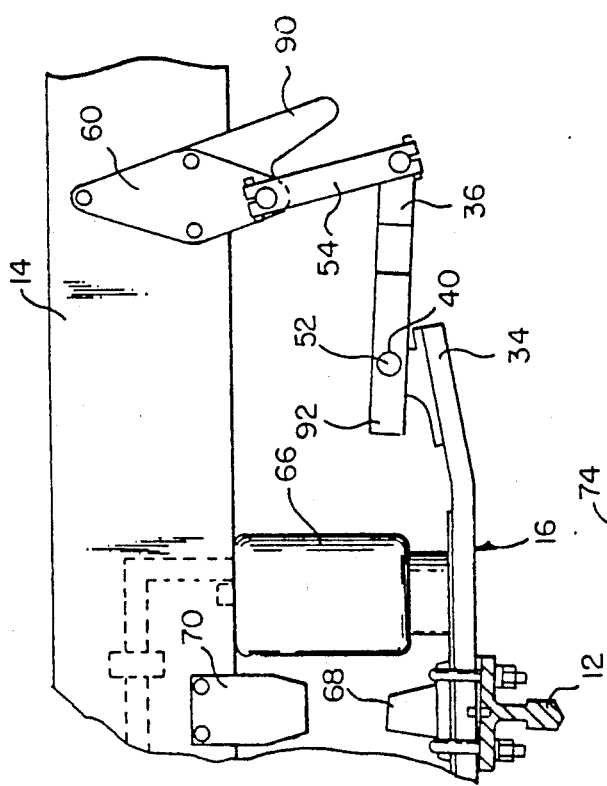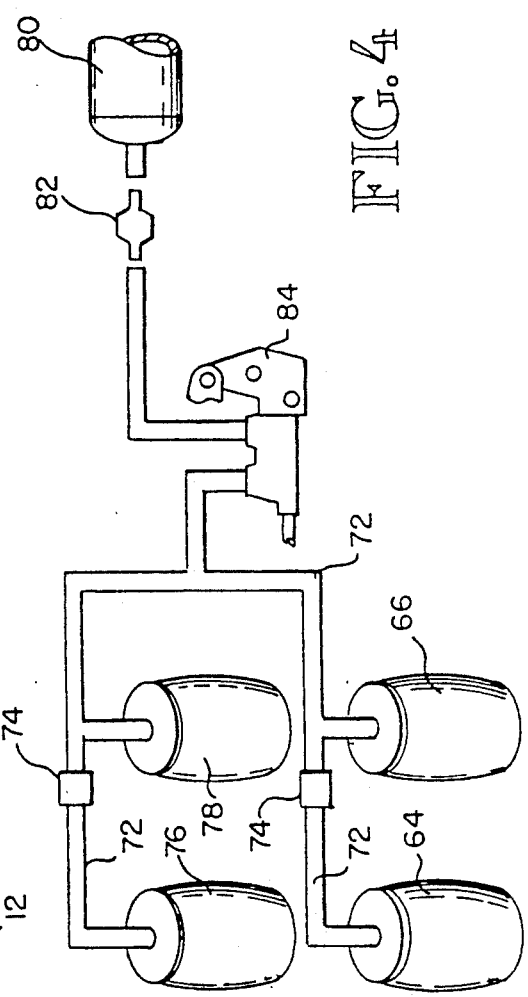

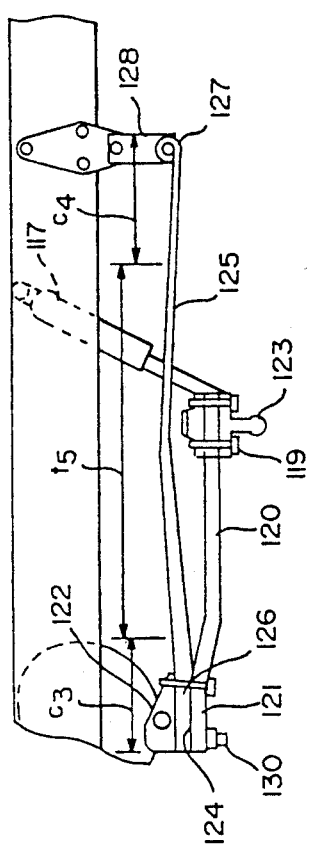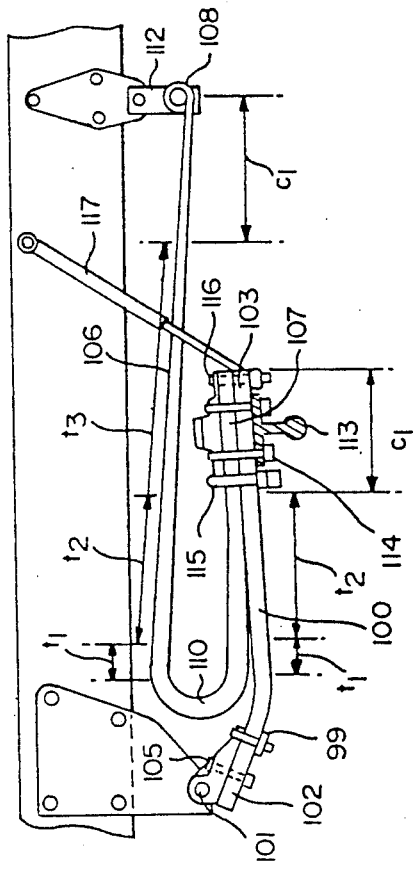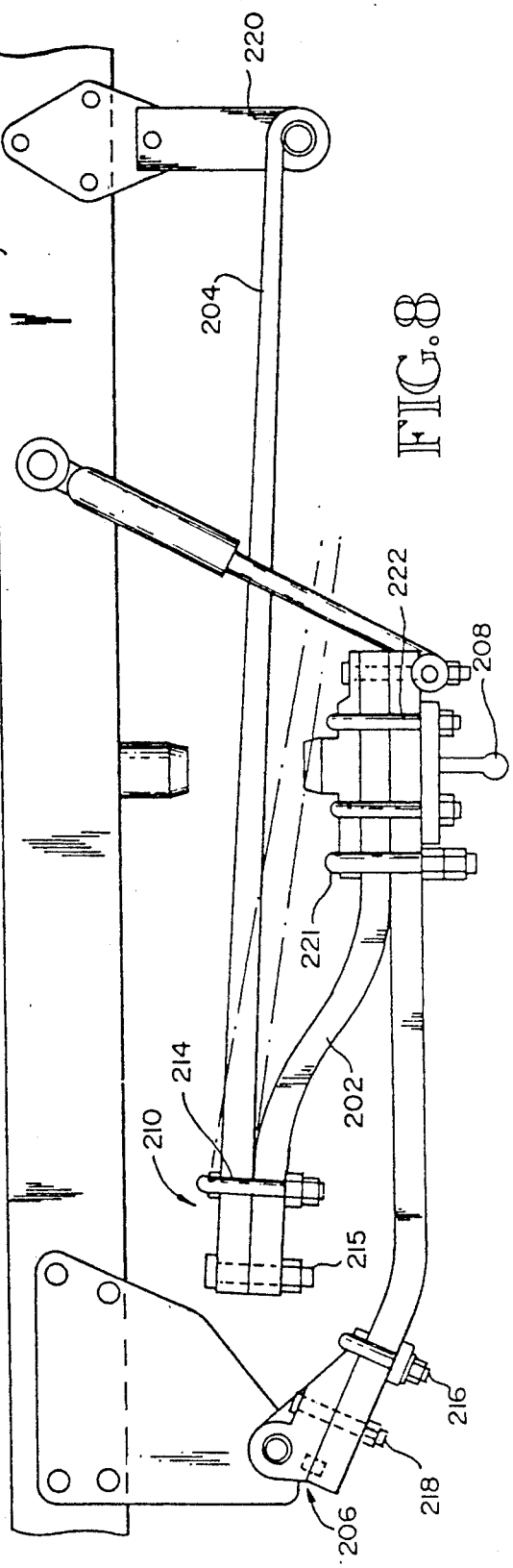

AXLE SUSPENSION SYSTEM

CROSS-REFERENCE TO RELATED APPLICATION

This application is a continuation-in-part of co-pending application Ser. No. 394,099, filed Aug. 15, 1989, currently pending, which is a continuation-in-part of application Ser. No. 175,745, filed March 31, 1988, now U.S. Pat. No. 4,856,812.

BACKGROUND OF THE INVENTION

The driver of a vehicle prefers to drive a vehicle which has a soft ride. The driver also prefers a vehicle that is stiff in roll. The vehicle may encounter road conditions, such as bumps, that a soft ride in the suspension will accommodate, but since the vehicle is also required to turn, stiffness in the roll of a vehicle is needed. Trucks are particularly sensitive to the stiffness in the roll.

In the past, a variety of suspension systems have been interposed between the wheels and the frame of the vehicle to improve the ride. One suspension system uses leaf springs. In this type of suspension, the leaf springs, usually a plurality of leaves arranged in a stack, cannot provide both a soft ride and large roll stiffness.

One method of providing a soft ride has been to place an air bag between the axle and the frame to absorb some of the bumps. A disadvantage of using air bags is that they are very flexible in the horizontal dimension and they are very soft, that is, they have a low spring rate, which makes the vehicle soft in roll.

SUMMARY OF THE INVENTION

It is therefore an object of this invention to provide a suspension system for a vehicle that is soft in ride and stiff in roll.

It is an object of this invention that the ride and roll characteristics of the vehicle can be varied independently of each other.

It is an object of this invention to provide a suspension system that provides damping at selected frequencies.

It is a further object of this invention to provide a suspension system having a beam member pivotally coupled to the frame at one end only and having two air bags coupling the beam member to the frame, one of the air bags being spaced further from the pivotal coupling than the other air bag.

It is a further object of this invention to provide a suspension system having a member coupled to the axle and the frame that pivots at one end and is freely movable at the other end to permit vertical displacement without any horizontal displacement at the other end of the member.

It is a further object of the invention to provide a suspension system having a torsionally rigid beam pivoted torsionally and laterally rigidly at one end of the frame in a manner which allows free vertical pivoting of the beam but no twist or lateral movement of the beam.

Another object is to provide a torsionally rigid beam pivoted torsionally rigidly to the frame and resiliently supporting the frame by a J-shaped elongated spring having a reverse bend separating two opposed ends.

Another object is to provide a torsionally rigid beam pivoted torsionally rigidly to the frame and resiliently supporting the frame by an elongated spring that is mounted at one end of the beam and at its opposite end to the frame with an axle secured to the beam between the first and second ends of the spring, the beam having a lever surface or beam seat capable of deflecting the spring upon upward pivotal movements of the beam.

These and other objects of the invention are accomplished by providing a vehicle suspension system having a torsionally rigid member or beam directly coupled to an axle. One end of the member is pivotally coupled to the frame, and the other end is coupled to the frame in such a way as to permit vertical displacement but not horizontal displacement at this other end of the member. In one embodiment two air bags are mounted on the member, one on either side of the axle. One air bag is mounted farther from the pivot point of the member than the other air bag. When the axle and frame move up and down with respect to each other, the air bag farther from the pivot point has a greater displacement than the air bag closer to the pivot point. Air lines couple the interior of the air bags to each other to permit air to flow between the bags. A restriction is placed in the line to restrict the flow of air between the air bags to provide damping. The amount of restriction is selected to provide damping at a selected frequency, such as the natural frequency of the system.

The member will be described now as a beam which is pivotally coupled to the frame at a first end using any well-known pivotal coupling that prevents twisting or lateral movement of the beam. The beam is coupled to the frame at a second end using two shackles. The two shackles restrict side movement of the beam but permit full freedom of movement in the vertical and fore-aft horizontal direction. This is accomplished by providing a first shackle pivotally coupled to the second end of the beam. A second shackle is pivotally coupled to the first shackle and to the frame. The second shackle is also coupled to the frame at a point well behind the second end of the beam. The first shackle therefore extends horizontally beyond the second end of the beam. This acts to extend the effective length of the beam. The first and second shackles are sufficiently long that full vertical motion by the beam is permitted. The first shackle extends behind the beam to ensure freedom of vertical movement through the entire expected range.

In one embodiment, the first shackle has an arm that acts as a safety stop to prevent the beam from exceeding a predetermined vertical displacement from the frame. A safety stop is provided behind the second shackle to prevent the beam from exceeding a predetermined horizontal displacement.

In the broadest form of the invention a torsionally stiff or rigid beam is pivotally mounted at one end in a torsionally stiff manner but allowing free vertical movement of the free second end of the beam. The beam supports the frame by resilient means that resiliently support the frame on the beam. In one embodiment the resilient means is an air bag or bags. A two-section shackle pivotally controls the free end of the beam. In a second embodiment the resilient means is a tapered J-shaped spring. In a third embodiment the resilient means is an elongated spring contacted on its underside by an upward beam seat or lever surface on the beam. The advantages of the beam are best realized when applied to a torsionally limber truck T-section, front axle but also can be used with a torsionally stiff tubular section rear axle.

Finally, according to yet another embodiment of the invention, the J-shaped spring is replaced by two elongate springs having ends which are secured to one another. Thus, in this embodiment, the torsionally stiff beam is secured at one end thereof to the vehicle frame and at the other end thereof to the axle, a first spring is secured at one end thereof to the beam proximate the axle, and a second spring is secured at one end thereof to the opposite end of the first spring and is secured at the other end to the vehicle frame.

BRIEF DESCRIPTION OF THE DRAWINGS

FIG. 1 is a side elevation of the vehicle suspension system.

FIG. 2 is an end view of the suspension as viewed in the direction of the arrows 2—2 in FIG. 1.

FIG. 3 is a fragmentary isometric view of the two-shackle assembly.

FIG. 4 is a diagram of the air bags and air line connections.

FIG. 5 is a side elevation of an alternative embodiment of the suspension having safety stops.

FIG. 6 is a side elevation of a unique suspension with a J-shaped spring configuration.

FIG. 7 is a side elevation of a unique suspension with an elongated spring contacted by an upward bend or lever surface on the beam.

FIG. 8 is a side elevational view of a unique suspension, wherein the J-spring of the FIG. 6 embodiment is replaced with two springs.

DETAILED DESCRIPTION OF THE INVENTION

A vehicle suspension system of one embodiment is labeled generally as 10, is shown in FIG. 1. The systems shown hereinafter will be described for one side of the vehicle, it being understood that a duplicate system will be provided on the other side of the vehicle. The suspension system includes an axle 12 and a frame 14 of the vehicle. The axle 12 is shown as a front axle; however, the teachings with respect to the suspension system could be used to mount the frame on any axle. A beam or member 16 is directly coupled to the axle through appropriate couplings, such as U-bolts 18 and 20. The member 16 is, in the preferred embodiment, a single beam of relatively rigid and inflexible steel. Advantages are achieved by using a single rigid beam that is designed to be stiff and unbending under load, if compared to a spring member.

The beam 16 is pivotally coupled at a first end 22 to the frame 14, using any suitable pivotal coupling 24 known in the industry, to provide pivoting characteristics of the beam at this point. A suitable coupling is an eye assembly 26 attached to the beam 16 through bolts 28 and 20 to hold a pivot post about 32 secured to the frame 14 by plates 33. The beam 16 extends lengthwise towards the rear of the vehicle. The beam is coupled at its rear or second end 34 to permit freedom of movement, as described herein.

The beam 16 includes a main body portion 62. The axle 12 is coupled to the beam at the main body portion. Two conventional air bags 64 and 66 are coupled to the beam at the main body portion. A pair of safety stops 68 and 70 are provided on the beam and the frame, respectively, to limit movement of the beam. A shock absorber 71 may also be coupled between the beam and the frame, if desired.

The two air bags are each placed the appropriate distance on either side of the axle. For air bags of the same dimensions and qualities, they are generally equidistant from the axle. The relative distance from the axle may be varied, however, depending on the size of each air bag, system requirements, etc.

An air line 72 couples the interior of air bag 64 to the interior of air bag 66. The air line includes a restriction or orifice 74 between the air bags 64 and 66. The air line 72 also couples the air bags to an air supply 80, as shown in FIG. 4. A pair of air bags 76 and 78 for the opposite side of the vehicle are also coupled together through a restriction 74 and to the same air supply 80 through the air line 72. A suitable protection valve 82 is coupled between the air supply 80 and bags. A conventional leveling valve 84 is provided between the air supply 80 and the bags, as is known in the industry.

The restriction 74 between the air bags is an orifice having a selected diameter less than the internal diameter of the air line 72. The size of the orifice is selected to control the velocity of the air flow between the two air bags.

The air bags are designed such that they will provide a soft ride. The air bags are designed to have a low spring rate, which in turn provides a low natural frequency of the sprung mass. This aids to provide a soft ride. The air bag spring rate is made relatively low compared to the air bag spring rate permitted in air bags on other suspension systems. A potential problem that occurs when using air bags having a low natural frequency is that the vehicle may encounter road conditions that coincide with the natural frequency of the system. If the system begins to move at the system natural frequency, the bumps are amplified instead of being damped. In the event the bumps are amplified, the ride becomes uncomfortable.

The particular air bag arrangement of this invention solves the problem of amplifying a vibration occurring at the natural frequency of the system in the following way. Two air bags are provided for each beam attached to the axle. One air bag 64 is closer to the axis of the pivot post 32 than the other air bag 66. The beam thus forms a lever arm such that the air bag 64 is always displaced less than the air bag 66. The result is that the bag 66 will force air into bag 64 through the orifice 74, providing damping of the bag 64.

By correctly selecting the diameter of the orifice 74, either by the selection of the orifice or by providing a variable size orifice, the damping, which is frequency sensitive or tunable, can be adjusted to the frequency desired. Usually, the damping is desired to match the system natural frequency. Even if conventional damping is needed, such as by a shock absorber, it can usually be set to be less in value, again providing improved isolation. The proper size of the restriction to provide damping at the system natural frequency depends on many factors, including the size of the air bags, the length of the beam 16, the weight of the vehicles, etc.

The use of a rigid beam for member 16 provides significant advantages. The rigid beam flexes relatively little in the main body portion between the axle connection and the air bag connection. Substantially all of the weight of the frame is transferred through the air bags to the axle. The air bags become the primary spring rather than the beam 16. The beam can therefore be designed to be rigid and unbending compared to a plurality of leaf spring members. A single beam of strong steel may be used. This is also much thinner than a plurality of leaf springs. The thinner beam permits use of longer air bags, which allow for lower spring rates.

An important advantage to a rigid beam is the stiffness provided in roll. The beam has a much greater stiffness, both in bending and in torsion, than a leaf spiring member. The rigid beam provides the needed stiffness in roll. The air bags provide the desired soft ride. Thus, the combination of one or more air bags and a single rigid beam provide the synergistic result of an air suspension that is both soft in ride and stiff in roll.

The present invention uses an air bag system that effectively isolates the spring properties from the rest of the system. The beam member is made very stiff in the roll and coupled rigidly in torsion or twisting to the frame to resist roll. The air bags can now be designed to provide the optimum softness in the ride. That is, the beam is designed to provide the optimum stiffness in roll without being concerned about the softness of the ride. In this way, the system can be designed to have both optimum ride and roll characteristics independent of each other.

Beam 16 is coupled at a second end 34 to the frame through a two-shackle coupling. The first shackle 36 is pivotally coupled to the second end 34 of the beam using a suitable coupling assembly, such as a spring eye 38 (FIG. 3), a bushing 40 and a pin 42 having a pivotal axis 52. The spring eye is attached to the beam using suitable U-bolts 44 and 46.

The first shackle 36, attached at end 34 of beam 16, is fork-shaped, having a body portion 46 and a forked portion 48. An open space 50 of sufficient size is provided immediately behind the beam to permit the beam complete freedom of pivotal movement about pivotal axis 52. A first shackle member 36 made of two separate links would also be suitable to provide a space for pivoting; however, a single-piece forked shackle is preferred. Full pivoting motion must be provided at both ends of the shackle 36.

A second shackle 54 is pivotally coupled through a pin 56 to the first shackle 36. The second shackle 54 is pivotally coupled through a pin 58 to the frame 14 by attachment to rigid frame plates 60. The second shackle 54 is a two-piece member, including links 54a and 54b in the preferred embodiment, but could be other suitable shapes that permit full pivoting motion at both ends of shackle 54.

The two-shackle coupling provides the advantage of permitting the second end of the beam 16 to move up and down, in the vertical direction, with no side-to-side horizontal movement. The air bags provide proper springing of this vertical motion. The pivotal motion of the free end of the beam will also result in limited forward and rearward motion in the horizontal direction. The shackle coupling resists both twisting and side-to-side movement of the beam and thus provides stiffness in roll.

An understanding of the increased torsional resistance of the beam and thus increased roll stiffness in the vehicle is best shown by comparing the stiffness in torsion of the beam 16 and the stiffness in torsion of a leaf spring. In a leaf spring suspension, only the forward and rearwardmost ends of one spring leaf are connected to the frame. Therefore, torsional resistance is primarily determined by the torsional resistance of this single leaf rather than all leaves combined.

A single typical leaf of a leaf spring suspension is one-half inch thick (vertical thickness) and four inches wide (horizontal width). One embodiment of a beam of this invention is, by comparison, one and one-fourth inch thick (vertical thickness) and four inches wide (horizontal width).

Torsional deflection is:

$$0 = \frac{TL}{KG} \text{ where}$$

T = torsion (inch−pound)
L = length of shaft or bar (inch)
G = modulus of stiffness of material (lb/in$^2$)
K = section torsional stiffness Stiffness in torsion for a rectangular section where width = W and thickness = T is:

$$K = \left[ \frac{WT^3}{16} \frac{16}{3} - 3.36 \frac{T}{W} \left( 1 - \frac{T^4}{12W^4} \right) \right]$$

Using this formula, it can be shown for the above dimensions that the beam 16 has a torsional stiffness of 2.02 and the single leaf spring has a torsional stiffness of 0.1535.

The first shackle 36 extends substantially parallel to the main body of the beam 16. The first shackle is thus a long link that acts as an extension of the beam. The beam can be cut short to allow a lighter weight beam to be used. This permits the beam to be cut short, immediately after the main body portion, and the shackle 36 to be extended to permit full freedom of motion in the vertical dimension of the end of the beam. This ensures that the loading is through the air bags rather than through the pivots.

Improved roll stability is obtained by minimizing the total length, including shackles, from the axle to the frame. By cutting the beam short, directly behind the main body portion, the overall length from the axle to the frame is decreased, providing enhanced roll stability.

The second shackle, plus the length of the bracket 60, have a length equal to or greater than the distance between the second end 34 of the beam 16 and the frame 14. This ensures that the first shackle is generally parallel to the frame 14. This permits better freedom of motion of the beam 16 so that the relative motion of the axle with respect to the frame can be absorbed by the air bags, which have a very low spring rate.

An alternative embodiment of the suspension is illustrated in FIG. 5. If the beam should break forward of the axle, the axle would move rearwardly as the brakes were applied. Rearward movement of the beam is resisted by the beam on the opposite end of the axle on the opposite side of the vehicle, and unlimited movement is precluded when the shackle 54 hits the stop 90.

The shackle 36 is also provided with an extension 92 that extends forward from the pivot axis 52. The extension limits the downward movement of the free end 34 of the beam. The stop 90 and extension 92 will not act to restrict the free movement of the beam under normal operating conditions but will restrict the movement of the beam in the event failure of some part of the beam occurs or extremely hazardous road conditions are encountered.

In the embodiment of FIG. 6, the beam 100 of the same torsional stiffness as beam 16 is again pivotally mounted for free vertical pivotal movement but no lateral or twisting movement by a pivot 101. The pivot is claimed to the beam through bolts 105 and a U-bolt 99. The beam also has a forward first end 102, a rearward second end 103 and a central portion 104. In this embodiment, however, rather than using air bags the beam rearward second end resiliently supports the frame by a generally J-shaped spring 106 having a first end 107 and a second end 108. The ends of the spring are separated by a reverse bend 110 located more closely to the spring first end 107 than to the spring second end 108. In a preferred form of this embodiment, a spring of 4 inches in width has a thicker bend (for example 1.9 inches) tapering to thinner first and second ends. After a short transition length $t_1$ at each end of the bend, the spring tapers as at $t_2$ toward the first end. Rearward of the first end, however, the spring tapers as at $t_3$ additionally toward the second end. The thickness at the second end, therefore, is about 0.63 inches whereas the thickness of the first end is about 1.33 inches. For the same distance from the bend toward each end of the spring the taper and thickness are approximately equal. The remaining length of the spring end 108 is of constant thickness at $c_1$. The transition lengths $t_1$ at each end of the bend reduce the thickness more rapidly before the uniform taper begins.

The bend and the long length between the bend and the axle, advantageously maximizes the length of the spring to produce a lower spring rate and thus a softer ride. The J-spring of this invention has a maximum moment arm almost twice the length of the moment arms of the springs for a conventional leaf spring with a centrally located axle.

$$\text{If } S = \text{stress} = \frac{M}{Z}$$

where M=moment at the section and Z=the section modulus, then the section modulus of spring 106 diminishes generally uniformly from the bend transition sections $t_1$ to the uniform thickness areas $c_1$ of the first and second ends of the spring.

The second end of the spring is pivotally secured to the frame by a shackle 112. Axle 113 is clamped to the beam second end by U-bolts 114. The clamp can be made stronger by additional U-bolt 115 and through bolts 116.

A shock absorber 117 is provided for damping.

The beam acts as a stiff torsion bar to make the suspension stiff in roll, the desired characteristic. The axle has two frame attachment points at 101 and 112 for the spring and beam together for steering control and for transmitting side loads to the frame.

The bend 110 has the tension on the outside of the bend, which is desirable for fatigue resistance. A curved spring has the higher stress in the inside of the curve and the thickness of the spring at the curve is determined by the stress limit desired at the inside of the curve. Setting the inside curve stress to the same value of the straight section of the spring, results in a tension stress at the outside of the curve substantially less than in the straight section.

In the embodiment of FIG. 7, the torsionally stiff beam 120 of the same cross section and stiffness as beam 16 is also pivotally mounted at its first end 121 to the frame by a pivot 122. The pivot is clamped to the beam and spring 125 by U-bolt 132 and stud bolt 130. The pivot allows vertical pivotal movement but not lateral or twisting movement of the beam. The beam second or rearward end 119 is secured to the axle 123 by suitable U-bolts. The beam has an upward seat or lever surface 124.

An elongated spring 125 has a first or forward end 126 clamped to the beam forward end to pivot with the beam and is pivotally connected at its rearward or second end 127 to a shackle 128 pivotally connected to the frame. The lever surface presses against the underside of the spring and supports the frame via the spring.

The spring rate at the axle 123 is the rate measured at the free or rear end 127 of the spring times the square of the distance (to the load) divided by the distance from the pivot 122 to the axle 123.

A theoretical evaluation of the suspension designs of FIGS. 6 and 7 compared to a conventional leaf spring configuration with a centrally located axle demonstrates the advantages associated with the suspension of the present invention. First, it is necessary to compare the embodiment of FIG. 7 with a conventional leaf spring suspension having a centrally located axle, for the same spring width, maximum stress and number of leaves. The spring of FIG. 7 has the same total length of spring leaf as a conventional spring, except that the spring of FIG. 7 has only one spring arm of twice the length of each of the conventional spring arms. As a result, the spring of FIG. 7 has a lower rate, 71% than that of a conventional design. The embodiment of FIG. 6 is similar to that of FIG. 7 but with an even longer spring arm length and even lower spring rate.

FIG. 8 illustrates yet another embodiment of the invention. Referring thereto, this embodiment is similar to the FIG. 6 embodiment with the exception that two spring elements, which are secured together at respective end portions, are substituted for the J-shaped spring. Accordingly, the FIG. 8 embodiment includes a first beam 200 and two spring elements 202, 204, respectively. The beam 200 is pivotally secured at one end thereof to the frame at pivot point 206 and is secured at the other end thereof to the axle 208. The two spring elements 202, 204 are secured at respective ends to one another at joint 210. As illustrated in FIG. 8, the first spring 202 bends downwardly such that the opposite end of the spring element is secured to the beam 200 and the axle 208, as illustrated. The second spring element 204 extends substantially horizontally, parallel to the frame of the vehicle and is secured at the other end thereof to the frame 214 at joint 212. Accordingly, the first and second spring elements combine to form a substantially J-shaped spring thereby providing the same advantages as the J-shaped spring element discussed above in regard to the FIG. 6 embodiment. In particular, the two-piece spring achieves a low spring rate and a high torsional, or roll, stiffness.

The beam 200 and spring elements 202, 204 are respectively secured to the frame 214 and the axle 208 in the same manner as the J-shaped spring of the FIG. 6 embodiment, the only difference being the manner in which the first and second spring elements 202, 204, respectively are secured together by utilizing U-bolt 214 and through-bolt 215. Thus, the torsionally stiff beam 200 is pivotally secured to the frame 214 at pivot 206 utilizing a U-bolt 216 and through-bolts 218. Additionally, the second spring element 204 is pivotally secured to the frame at joint 212 utilizing a shackle 220. Finally, the first spring element 202 is secured to the beam 200 utilizing U-bolt 221. Additionally, a pair of U-bolts 222 secure the first spring element 202 and beam 200 to the axle 208. Also provided is a shock absorber 224 for damping.

In the preferred embodiment, the thickness of the first spring element 202 is approximately 1.53 inches at the end which is secured to the second spring element and gradually decreases to 1.28 inches at the opposite end, which is connected to the beam 200 and axle 208. Additionally, the thickness of the second spring element 204 at the end which is connected to the first spring element 202 is approximately 1.5 inches and decreases towards the opposite end connected to the chassis where the thickness is approximately 0.63 inches.

We claim:

1. A suspension system for a vehicle, comprising:
a frame;
an axle having wheels attached thereto;
a rigid torsionally stiff beam coupled to said axle and to said frame, said beam having a first end, a second end and a body portion between said first end and said second end, and said first end being spaced from said body portion;
first pivot means fixed to said beam and coupled to said frame at said first end of said beam to pivotally couple said beam to said frame at said first end portion and prevent said beam from moving laterally or twisting with respect to said frame but allowing vertical pivotal movement of the second end of the beam; and
resilient means coupled between said axle and said frame to resiliently support said frame on said axle while allowing free vertical movement but minimal lateral movement of said beam and axle.

2. The suspension of claim 1, including second pivot means coupled to said second end of said beam and said frame for permitting vertical displacement of said second end of said beam but limiting fore-aft movement, twisting, or side-to-side movement the roll characteristics of said vehicle being primarily determined by the properties of the rigid beam and the ride characteristics of said vehicle being primarily determined by the properties of said resilient means.

3. The suspension system according to claim 2, said frame having a forward end and a rearward end, wherein said beam is an elongated bar having its first end pivotally secured toward the forward end of the frame and its second end secured rearwardly of the first end of the bar, said resilient means including a pair of air bags, a shock absorber secured between said body portion of said beam and said frame, said second pivot means including a forked first shackle having opposed arms and a central body, said opposed arms being secured to said beam second end, said second pivot means also including a parallel link shackle having opposite ends, one end of said links being pivotally coupled to said central body of said first shackle and the other end of said links being pivotally coupled to said frame, whereby said first and second shackles provide lateral stiffness to the second end of said beam while allowing free vertical pivotal movement of said second end of said beam.

4. The suspension system of claim 1, said resilient means including a J-shaped elongated spring having a central portion with a bend, a first end on one side of and close to the bend and a second end on the other side of and spaced further from said bend, said first end being secured to said second end of said beam and to said axle, further including a shackle pivotally connected to the frame, said second end of said J-shaped spring being pivotally coupled to said shackle.

5. The suspension system of claim 4, said J-shaped spring having a greater section modulus at said bend than at said first and second spring ends, and said section modulus diminishing from said bend toward said first and second spring ends for providing a constant bending stress along the length of the spring.

6. The suspension of claim 5 wherein said spring is tapered only in thickness from said bend to said spring and second ends.

7. The suspension system of claim 6 wherein said spring first end is secured to said beam and said axle by U-bolts through the axle.

8. The suspension of claim 7, including an additional U-bolt securing the spring first end to said beam adjacent to, but spaced from, said axle.

9. The suspension of claim 7, including additional through bolts securing said spring first end to said beam adjacent to, but spaced from, said axle.

10. The suspension of claim 9, including an additional U-bolt securing the first spring end to said beam adjacent to a side of the axle opposite said through bolts.

11. The suspension of claim 1, said resilient means including an elongated resilient spring having first and second ends, said first end of said spring connected to said first end of said beam, said second end of said spring pivotally coupled to said frame on the opposite side of said axle from said first end of said spring, said body portion of said beam having a lever surface in contact with said spring, whereby vertical upward movement of said beam will deflect said spring for resiliently supporting the frame on the axle.

12. A suspension system for a vehicle, comprising:
an axle;
a rigid, torsionally stiff beam having a first end pivotally connected to a frame of said vehicle and a second end secured to said axle, said pivotal connection at said first end permitting free pivotal vertical displacement of said beam but substantially precluding twisting or side-to-side movement of said beam; and
an elongated spring having one end in contact with said beam and a second end pivotally connected to said frame.

13. The suspension system of claim 12, said elongated spring being J-shaped having a reverse bend between said first and second ends, the bend overlying the beam, the first end of the spring connected to the axle and being more closely spaced to the bend than the second end of the spring.

14. The suspension of claim 13, said bend being of a uniform section modulus greater than the section modulus of the remainder of the spring, the sections toward each end of the spring immediately adjacent the bend having diminishing section modulus transition sections, the sections of the spring at the ends of the spring being of generally uniform section modulus, the sections of the spring toward each end adjacent to the transition sections each having a uniformly diminishing section modulus of equal length, and the remaining section of the spring toward the second end of the spring having an additional length of diminishing section modulus.

15. The suspension of claim 13, said first end of the spring being joined to said axle by U-bolts, and additional bolts securing the spring to the beam adjacent to, but spaced from, the axle.

16. The suspension of claim 13, the second end of the spring being pivotally connected to the frame on the opposite side of the axle from the first end of the beam.

17. The suspension system of claim 12, said elongated spring having an upper side and an underside, and having one end of the spring rigidly connected to the beam first end, and a second end pivotally connected to the frame on the opposite side of the axle from said beam first end, said beam having a lever surface adjacent the beam first end in engagement with the underside of the spring whereby upward pivotal movement of the beam will be resiliently resisted by said spring.

18. The suspension system of claim 12 wherein said spring includes a pair of spring elements which are secured together at respective ends thereof.

19. The suspension system of claim 18, wherein said spring elements are connected together at a position above said beam.

20. The suspension system of claim 19 wherein a first of said spring elements has one end connected to said beam proximate said axle and extends in a first direction towards the first end of said beam, and a second of said spring elements is secured at one end to the other end of said first spring element and extends in a second direction, opposite said first direction, the other end being connected to said frame.

21. The suspension system of claim 20, wherein said other spring element is substantially parallel to said frame.

* * * * *